May 24, 1966 R. MANDELBAUM ETAL Re. 26,033
SIMPLEX LIQUID HANDLING APPARATUS HAVING IMPROVED ELECTRODE TYPE CONTROL SYSTEM
Original Filed Oct. 16, 1961
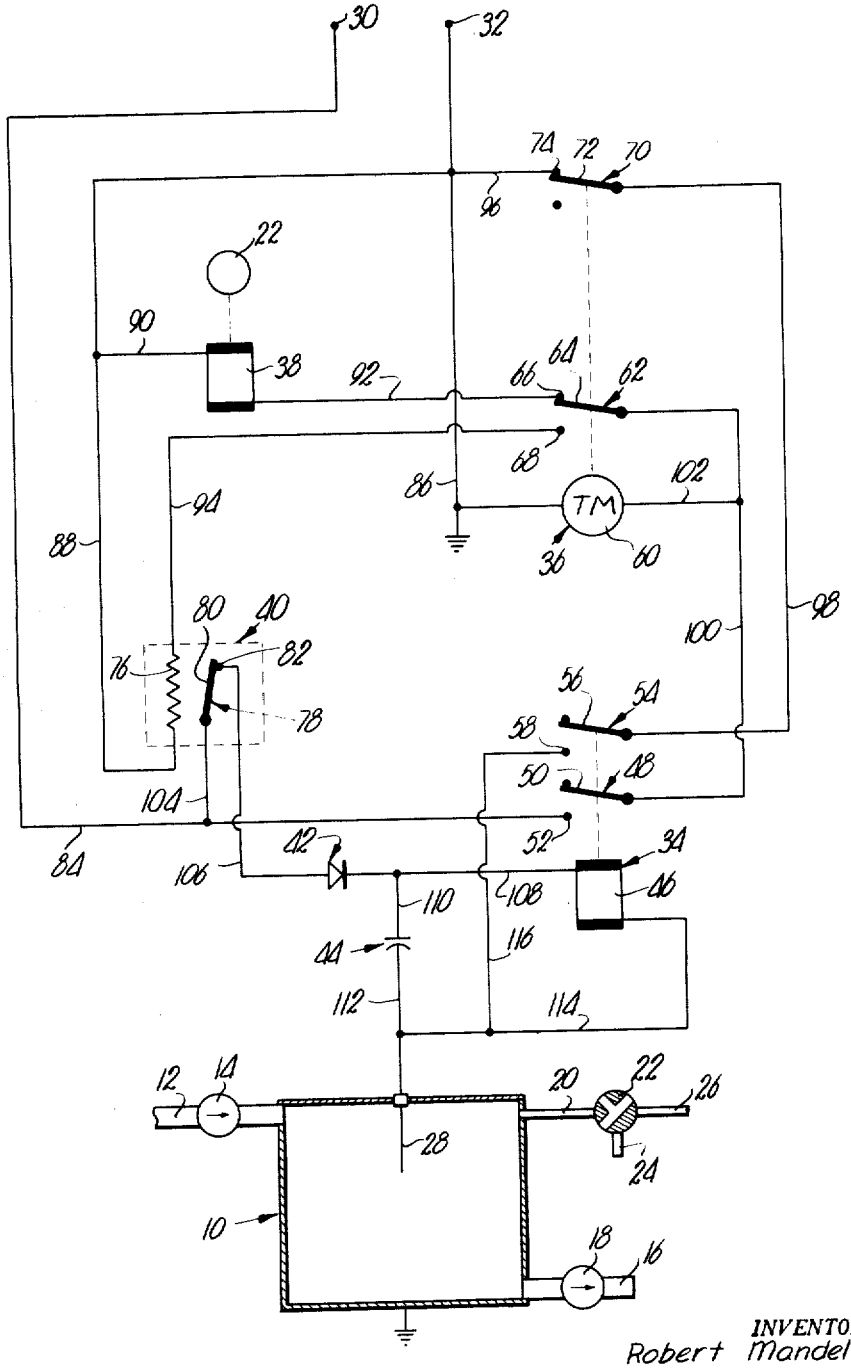
INVENTORS.
Robert Mandelbaum
BY Frank G. Weis
Hovey, Schmidt, Johnson & Hovey.
ATTORNEYS.

United States Patent Office

Re. 26,033
Reissued May 24, 1966

26,033

SIMPLEX LIQUID HANDLING APPARATUS HAVING IMPROVED ELECTRODE TYPE CONTROL SYSTEM

Robert Mandelbaum and Frank G. Weis, both of Kansas City, Mo., assignors to Union Tank Car Company, Chicago, Ill., a corporation of New Jersey Original No. 3,155,048, dated Nov. 3, 1964, Ser. No. 145,343, Oct. 16, 1961. Application for reissue Oct. 8, 1965, Ser. No. 496,249
10 Claims. (Cl. 103—241)

Matter enclosed in heavy brackets [ ] appears in the original patent but forms no part of this reissue specification; matter printed in italics indicates the additions made by reissue.

[The] *This* invention relates to material handling apparatus, and more particularly, to apparatus for receiving material until a predetermined amount has accumulated, at which time the material is automatically ejected by force. Apparatus of this type has particularly useful application in installations where material such as sewage or the like must be discharged against forces such as gravity.

It is well known to control the operation of apparatus of this nature with electrical control systems. Such systems are conventionally actuated by the completion of an electrical circuit by virtue of physical contact established between an electrode and the material when the latter reaches a predetermined accumulation in the retaining vessel. Once activated, the control system initiates a cycle during which the material is ejected from the vessel. Ideally, then, the apparatus is returned to its material-receiving condition until subsequent accumulation establishes contact with the electrode.

Heretofore, one disadvantage with such systems has been that the ejection cycle is initiated whenever such contact is established and continues substantially without interruption until the contact is broken. If, as often occurs, material clings to the electrode and establishes contact to ground by touching a wall of the vessel or the like, the apparatus continues in the ejection cycle. This results in loss of use of the apparatus and waste of the ejecting vehicle (often compressed air) until the necessary maintenance of the electrode is performed.

When automatic means is incorporated into the system to shut off the air, conventional systems have heretofore had no means for automatically ejecting the accumulated material.

Accordingly, it is the most important object of this invention to provide apparatus having an electrical control system which restores the apparatus to its material-receiving condition for a predetermined period of time following the ejection cycle, thereby obviating the difficulty caused by fouling of the material sensing electrode.

Another important object of our instant invention, and in conjunction with the foregoing object, is to provide apparatus for handling material that is not solely dependent upon the material sensing device for returning the apparatus to its material-ejecting condition.

Yet another object of our invention is the provision of time delay components to insure that the apparatus remains in the material-receiving condition for a predetermined length of time following the ejection cycle to permit the desired accumulation of material before ejection thereof.

A still further object of this invention is to provide material-handling apparatus which is substantially maintenance-free, thereby permitting use of the apparatus in relatively inaccessible places such as underground sewage installations or the like.

Still another object of our invention is the provision of such apparatus having an electrical control adapted for utilization of commercially available alternating current electrical energy, yet having direct current circuits therein to permit greater sensitivity of the material sensing device and longer life of the sensing electrodes.

The drawing is a schematic diagram of an electrical control for material-handling apparatus [emboding] *embodying* the principles of the instant invention with the material-receiving vessel shown in cross section.

The material-handling apparatus includes a material-receiving vessel 10 which is normally closed, and has an inlet pipe 12 communicating therewith and adapted to be coupled with a source of material to be handled. Pipe 12 is provided with a check valve 14 therein to permit the flow of fluid in the direction of vessel 10 and to prevent flow in the opposite direction. An outlet pipe 16 also communicates with vessel 10 and is provided with a check valve 18 for permitting the flow of fluid in only one direction through outlet 16. It will be understood that outlet 16 is adapted to lead to a suitable place of discharge for the material to be handled by the apparatus.

In order to facilitate the accumulation of material within vessel 10, the latter is provided with a pipe 20 communicating therewith and having a 3-way valve 22 therein. A vent pipe 24 extends from valve 22 for the purpose of placing vessel 10 in communication with the atmosphere when valve 22 is disposed in its normal position. A conduit 26 is also in communication with valve 22 and is adapted to be coupled to a source of pressurized fluid such as compressed air or the like, for conducting such pressurized fluid into vessel 10 when valve 22 is shifted to its alternate position. The pressurized fluid is utilized for the purpose of ejecting the material from vessel 10.

An electrical control is provided for the apparatus and includes means for sensing the level of material within vessel 10 in the form of an electrode 28, preferably extending into vessel 10 adjacent the top thereof and in position to be engaged by the material when the latter has reached a predetermined accumulation within the vessel. In addition to electrode 28, the electrical control for the material-handling apparatus includes a source of electrical energy shown as contacts 30 and 32, an electrically responsive switching device 34, a timer 36, a solenoid 38, a time delay switching element 40, a rectifier 42, and a capacitor 44.

The electrically responsive switching device 34 includes a coil 46, a normally open, single-pole, single-throw switch 48 having a movable pole 50, and a fixed contact 52. Device 34 also includes a second normally open, single-pole, single-throw switch 54 having a movable pole 56 and a fixed contact 58. The poles 56 and 50 of device 34 are operably coupled with coil 46 to be shifted into engagement with respective contacts 58 and 52 upon energization of the coil 46.

Timer 36 may be of any conventional type and includes an electrically operated time delay mechanism 60 operably coupled with a single-pole, double-throw switch 62. The latter has a movable pole 64, a normally closed fixed contact 66, and a normally open fixed contact 68. Additionally, mechanism 60 is operably coupled with a normally closed, single-pole, single-throw switch 70 having a movable pole 72 and a fixed contact 74.

Switching element 40 includes a component 76 operably coupled with a normally closed, *single-pole* [singe-pole], single-throw switch 78 having a movable pole 80 and a fixed contact 82. Component 76 is operably coupled with pole 80 to effect opening of switch 78 upon energization of component 76 and may be a thermoelectric heating element adapted to open switch 78 upon the passage of current through component 76. [Elment] *Element* 40 includes the characteristic of maintaining switch 78 in its open condition for a predetermined period of time, thus, the thermoelectric component 76 is ideally suited for element 40.

Rectifier 42 may be of any suitable type capable of converting alternating current electricity into direct current for a purpose to be explained later. Capacitor 44 may also be of any suitable type and the rating thereof is preferably calculated for cooperating with the rectifier for providing direct current energy, as will be explained more fully as the specification progresses.

The normally open fixed contact of switch 48 is electrically coupled with contact 30 of the source of electrical energy by line 84. The other contact 32 of the source is electrically coupled with one side of timer mechanism 60 by a line 86. Line 86 is connected to one side of component 76 by line 88, and one side of solenoid 38 is connected with line 88 by line 90. The other side of solenoid 38 is connected with the fixed contact 66 of switch 62 by line 92. The fixed contact 68 of switch 62 is electrically coupled with the other side of component 76 by line 94. Lead 96 connects the fixed contact 74 of switch 70 with line 86, and the movable pole 72 of switch 70 is coupled with the movable pole 56 of switch 54 with line 98. A line 100 interconnects the movable pole 64 of switch 62, and the movable pole 50 of switch 48, while the other side of mechanism 60 is connected to line 100 by a line 102.

Lead 104 connects the movable pole 80 of switch 78 to line 84, while the fixed contact 82 of switch 78 is coupled to rectifier 42 by line 106. The other side of rectifier 42 is coupled with the coil 46 of device 34 by line 108. Line 110 interconnects one side of capacitor 44 with line 108, and the other side of capacitor 44 is connected to electrode 28 by line 112. The latter is connected to the opposite side of coil 46 by a line 114. A line 116 couples line 114 to the fixed contact 58 of switch 54.

In operation, valve 22 is normally in position to vent the inside of vessel 10 to the atmosphere and to facilitate the flowing of material therein through inlet 12. When the material has accumulated in vessel 10 to a level wherein the material contacts electrode 28, a circuit is completed which energizes coil 46 of device 34. This energizing circuit may be traced from contact 30, through line 84, lead 104, pole 80 and contact 82 of switch 78, line 106, rectifier 42 (which converts the electricity into direct current), line 108, coil 46, line 114, line 112, electrode 28 to ground through the material and vessel 10. Upon being energized, coil 46 operates switches 54 and 48. The closing of switch 48 completes a circuit to energize solenoid 38 traceable from contact 30, through line 84, contact 52 and pole 50 of switch 48, line 100, pole 64 and contact 66 of switch 62, line 92, solenoid 38, line 90, line 88, line 86, to contact 32.

Solenoid 38 is thus energized and is operably coupled with valve 22 to effect shifting of the latter to its alternate position. This terminates the communication of vessel 10 with the atmosphere and permits pressurized fluid from the source to pass through conduit 26, pipe 20 and into vessel 10 where it forces the accumulation of material therein outwardly past check valve 18 through outlet 16. At the time solenoid 38 is energized, the closing of switch 48 also energizes mechanism 60 of timer 36. The circuit energizing timer 36 may be traced from contact 30, through line 84, switch 48, line 100, line 102, mechanism 60, line 86 to contact 32. Thus, mechanism 60 is energized to effect operation of the timer switches after a predetermined delay of time which may be preset, depending upon the requirements for the apparatus.

At the time coil 46 of switching device 34 is energized, a holding circuit is closed to continue the energizing of coil 46 for a predetermined length of time. This holding circuit may be traced from contact 30 of the electrical source, through line 84, lead 104, switch 78, line 106, rectifier 42, line 108, coil 46, line 114, line 116, switch 54, line 98, switch 70, lead 96, line 86 to contact 32. Thus when the material is ejected from within vessel 10 to a level where there is no longer physical contact between the material and electrode 28, and the initial circuit energizing coil 46 previously described is broken, the holding circuit just enumerated maintains the energy to coil 46. Throughout this time, valve 22 is held in its alternate position and the material is continuously ejected from within vessel 10.

After mechanism 60 of timer 36 has been energized for a predetermined length of time, the mechanism shifts the poles 64 and 72 of switches 62 and 70 respectively. Pole 64 shifts into contact with normally open contact 68 of switch 62 and away from the normally closed contact 66 thereof. This breaks the energizing circuit to solenoid 38, allowing valve 22 to return to its normal position venting vessel 10. Up until this time the valve circuit has not been broken, so if solenoid 38 is continuously energized the valve 22 continues to admit and waste pressurized fluid, not allowing the vessel 10 to fill. The shifting of pole 72 from normally closed contact 74 of switch 70 breaks the holding circuit previously described and thereby permits de-energization of coil 46. When coil 46 is de-energized, the movable poles 56 and 50 of switches 54 and 48, respectively, shift to their normally open positions.

As timer 36 shifts the switches thereof, a circuit may be traced from contact 32 of the source through line 86, line 88, component 76 of element 40, line 94, contact 68 and pole 64 of switch 62 line 100, through pole 50 and contact 52 of switch 48 if the latter is closed, through line 84 to contact 30 of the source. However, as has been pointed out, the shifting of switch 70 by timer 36 should break the holding circuit and de-energize coil 46, thereby permitting switch 48 to open and prevent the circuit that would energize component 76 of element 40 from being closed. On the other hand, if for some reason, such as the maintaining of electrical contact between electrode 28 and ground, through the walls of vessel 10 by material clinging to electrode 28 and touching the walls or the like, coil 46 will remain energized through its primary energizing circuit previously described. Thus, the breaking of the holding circuit will be not release switches 54 and 48 and the circuit energizing component 76 will be made with pole 50 engaging contact 52 of switch 48. When this occurs, the switching device 34 remains operated and switches 54 and 48 are in their closed positions, the mechanism 60 of timer 36 remains energized, the switches 62 and 70 remain in their shifted positions through the action of mechanism 60, solenoid 38 is de-energized and valve 22 returns to its normal position. Thus, if nothing is done to prevent this situation, the apparatus remains in the filling cycle and can never eject its contents. This condition has, in the past, caused a great deal of difficulty in heretofore known material handling devices.

To obviate this undesirable condition, safety means is incorporated into the control for the apparatus. Such safety means includes the energizing circuit for component 76 previously described. It may be readily seen that when switch 62 of timer 36 is simultaneously closed with switch 48 of switching device 34, component 76 is directly connected to the source of electrical energy. This causes a heating of component 76, resulting in the opening of switch 78 of element 40 after a predetermined delay to allow the vessel 10 to fill. When electrical contact is broken between pole 80 and contact 82 of switch 78, the primary energizing circuit for coil 46 of device 34 is broken. This permits switches 54 and 48 to open to break the energizing circuit for timer 60 and relay 40, irrespective of whether or not electrode 28 has become fouled and continues to sense the necessary accumulation of material within vessel 10 to initiate the ejection cycle.

It may be readily seen that as soon as switch 78 again closes, coil 46 will re-energize, permitting the closing of switches 54 and 48, and causing the apparatus to re-initiate the ejection cycle. Thus it is important that element 40 allow switch 78 to remain closed long enough to permit vessel 10 to fill with a substantial amount of material before coil 46 is de-energized. Preferably, element 40 is adjustable and may be selectively set to leave switch 78 closed for the desired period of time. Normally an element with delay ability of from 0 to 5 minutes is satisfactory with a delay setting of thirty seconds being desirable for many material handling installations. Additionally, it is necessary that switch 40 have a remake time of sufficient length to allow relay contacts 48 and 54 and timer mechanism 60 to reset. Thus, once open, the switch 78 does not close immediately.

It will be readily appreciated that any suitable time delay switching apparatus may be utilized in the system to provide the function of insuring a delay between the filling cycle and the ejection cycle. It has been found that a thermoelectric switching device such as has been described is entirely [adaquate] *adequate* for the purpose.

It is of particular importance to point out that the safety means for preventing the apparatus from remaining in the filling cycle only becomes operative upon the situation of improper functioning of the normal means for shifting valve 22 from its normal to its alternate position and back again. Normally, switch 62 will not be in position with pole 64 engaging contact 68 at the same time that pole 50 is engaging contact 52 of switch 48. Inasmuch as switches 70 and 62 operate together, the holding circuit for coil 46 is broken at the same time pole 64 of switch 62 is caused to engage contact 68. This permits switch 48 to open simultaneously with the closing of switch 62 to prevent such energization of component 76. It is only when contact is made between electrode 28 and ground, which continues the energizing of coil 46 when timer 36 shifts its switches, that element 40 is operated.

The material-handling apparatus of this invention is particularly useful for the purpose of handling sewage or the like which is to be discharged against forces such as gravity. If it is desirable to employ the apparatus for such purposes, it is but necessary to install vessel 10, and the control heretofore described operates automatically to eject the material through the force of air pressure or the like when a predetermined amount has been accumulated. There is no danger, because of the particular safety means, of the apparatus being ineffective for the purpose of receiving material simply because the electrode 28 for sensing the desired accumulation fails to function through fouling or the like. When this occurs, the safety means automatically takes over to provide a predetermined time delay between ejecting cycles of the apparatus, which delay may be preset to provide for the desired accumulation of material in vessel 10.

By utilizing rectifier 42 to change the alternating current from the source of electrical energy into direct current before the energy reaches coil 46, it is possible to utilize a more sensitive electrical switching device 34 to initiate the operation of the control system upon the filling of vessel 10 with material. Additionally, the direct current flowing through electrode 28 in the energizing of coil 26 materially increases the length of life of the electrode 28 over what would be possible if alternating current were used in this energizing circuit. However, in order to provide for the use of half wave rectified current which emanates from the source and the rectifier, capacitor 44 is interposed between lines 110 and 112. Thus the direct current stored in the capacitor 44 during the conducting half cycle of rectifier 42 is discharged to energize solenoid 46 during the nonconducting half cycle.

Although the apparatus has particular application in the handling of sewage, there is no intention to restrict its utilization for such purposes. On the contrary, this apparatus may be used for a wide range of functions.

Having thus described the invention, what is claimed as new and desired to be secured by Letters Patent is:

1. Material handling apparatus which comprises a closed material receiving vessel; inlet means connected to said vessel and adapted to be coupled to a source of material to be handled so as to permit the flow of material only in the direction of said vessel; vent means connected to said vessel; conduit means connected to said vessel and adapted to be coupled to a source of fluid under pressure; valve means operably associated with said vent means and conduit means of said vessel, said valve means having a normal position that permits communication between said vessel and said vent means and precludes communication with said conduit means, said valve means being shiftable to an alternate position wherein communication is established between said vessel and said conduit means and wherein communication with said vent means is precluded; means connected to said valve means for effecting the selective shifting of said valve means to the alternate position when said means is actuated; sensing means disposed within said vessel so as to be contacted by the material therein when a preselected level of material accumulation has been reached; outlet means connected to said vessel so as to permit the flow of material therefrom; circuit means electrically connected to said valve shifting means so that said valve shifting means is actuated in response to the energization of said circuit means, said circuit means being energized in response to said accumulated material contacting and grounding said sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting means to thereby return said valve means to the normal position and normally effecting the deenergization of said circuit means; and a second timing circuit being alternately rendered effective and ineffective for preselected periods of time as long as said sensing means continues to be grounded and in response to the continued energization of said circuit means whereby said valve shifting means is alternately actuated and deactuated for corresponding periods of time and the material handling apparatus is alternated between a material receiving state and a material ejecting state.

2. In combination with material handling apparatus having a closed material receiving vessel, including a vent communicating with the surrounding environment and a supply conduit coupled to a source of fluid under pressure, a selectively operable valve means that has a normal position which establishes communication between the vessel and the associated vent and an alternate position that establishes communication between the vessel and the source of fluid through the associated supply conduit, an inlet means that permits the flow of material to the vessel and outlet means that permits the flow of material out of the vessel after a preselected level of material accumulation has been reached as indicated by the material contacting a single probe sensing means that is disposed within the vessel; a control circuit which comprises means operably connectable to the valve means of the vessel so as to effect the shifting of said valve means when said means is in an actuated state; circuit means electrically connected to said valve shifting means so that said valve shifting means is actuated in response to the energization of said circuit means, said circuit means being energized in response to the accumulated material contacting and grounding said single probe sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting means to thereby return said valve means to the normal position and normally effecting the deenergization of said circuit means; and a second timing circuit being alternately rendered effective and ineffective for preselected periods of time as long as said sensing means continues to be grounded and in response to the continued energization of said circuit means whereby said valve shifting means is alternately actuated and deactuated for corresponding periods of time and the material handling apparatus is alternated between a material receiving state and a material ejecting state.

3. Material handling apparatus which comprises a closed material receiving vessel; inlet means connected to said vessel and adapted to be coupled to a source of material to be handled so as to permit the flow of material only in the direction of said vessel; vent means connected to said vessel; conduit means connected to said vessel and adapted to be coupled to a source of fluid under pressure; valve means operably associated with said vent means and conduit means of said vessel, said valve means having a normal position that permits communication between said vessel and said vent means and precludes communication with said conduit means, said valve means being shiftable to an alternate position wherein communication is established between said vessel and said conduit means and wherein communication with said vent means is precluded; a solenoid connected to said valve means for effecting the selective shifting of said valve means when said solenoid is actuated; single probe sensing means disposed within said vessel so as to be contacted by the material therein when a preselected level of material accumulation has been reached; outlet means connected to said vessel so as to permit the flow of material therefrom; circuit means electrically connected to said valve shifting solenoid so that said solenoid means is actuated in response to the energization of said circuit means, said circuit means being energized in response to said accumulated material contacting and grounding said single probe sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting solenoid to thereby return said solenoid to the normal position and normally effecting the deenergization of said circuit means; and a second timing circuit being alternately rendered effective and ineffective for preselected periods of time as long as said single probe sensing means continues to be grounded and in response to the continued energization of said circuit means whereby said solenoid is alternately actuated and deactuated for corresponding periods of time and the material handling apparatus is alternated between a material receiving state and a material ejecting state.

4. A circuit for controlling material handling apparatus including a closed material receiving vessel that has a vent communicating with the surrounding environment and a supply conduit coupled to a source of fluid under pressure, the apparatus also having a selectively operable valve means that has a normal position which establishes communication between the vessel and the associated vent and an alternate position that establishes communication between the vessel and the source of fluid through the associated supply conduit, the apparatus further including inlet means that permits the flow of material to the vessel and outlet means that permits the flow of material out of the vessel after a preselected level of material accumulation has been reached as indicated by the material contacting and grounding a single probe sensing means that is disposed within the vessel; which control circuit comprises means operably connectable to the valve means of the vessel so as to effect the shifting of said valve means when said means is in an actuated state; circuit means electrically connected to said valve shifting means so that said valve shifting means is actuated in response to the energization of said circuit means, said circuit means being energized in response to the accumulated material contacting and grounding said single probe sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting means to thereby return said valve shifting means to the normal position and normally effecting the deenergization of said circuit means; and a second timing circuit being alternately rendered effective and ineffective for preselected periods of time as long as said single probe sensing means continues to be grounded and in response to the continued energization of said circuit means whereby said valve shifting means is alternately actuated and deactuated for corresponding periods of time and the material handling apparatus is alternated between a material receiving state and a material ejecting state.

5. Material handling apparatus which comprises a closed material receiving vessel; inlet means connected to said vessel and adapted to be coupled to a source of material to be handled so as to permit the flow of material only in the direction of said vessel; vent means connected to said vessel; conduit means connected to said vessel and adapted to be coupled to a source of fluid under pressure; valve means operably associated with said vent means and conduit means of said vessel, said valve means having a normal position that permits communication between said vessel and said vent means and precludes communication with said conduit means, said valve means being shiftable to an alternate position wherein communication is established between said vessel and said conduit means and wherein communication with said vent means is precluded; means connected to said valve means for effecting the selective shifting of said valve means to the alternate position when said means is actuated; sensing means disposed within said vessel so as to be contacted by the material therein when a preselected level of material accumulation has been reached; outlet means connected to said vessel so as to permit the flow of material therefrom; circuit means electrically connected to said valve shifting means so that said valve shifting means is actuated in response to the energization of said circuit means, said circuit means being energized in response to said accumulated material contacting and grounding said sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting means to thereby return said valve means to the normal position and normally effecting the deenergization of said circuit means; and a second timing circuit being initially energized a preselected period of time after said first timing circuit and in response to the continued energization of said circuit means, said second timing circuit being connected in circuit with said circuit means so as to be alternately rendered effective and ineffective for preselected periods of time after its initial energization so as to alternately actuate and deactuate said valve shifting means for corresponding periods of time.

6. A circuit for controlling material handling apparatus including a closed material receiving vessel that has a vent communicating with the surrounding environment and a supply conduit coupled to a source of fluid under pressure, the apparatus also having a selectively operable valve means that has a normal position which establishes communication between the vessel and the associated vent and an alternate position that establishes communication between the vessel and the source of fluid through the associated supply conduit, the apparatus further including inlet means that permits the flow of material to the vessel and outlet means that permits the flow of material out of the vessel after a preselected level of material accumulation has been reached as indicated by the material contacting and grounding a single probe sensing means that is disposed within the vessel; which control circuit comprises means operably connectable to the valve means of the vessel so as to effect the shifting of said valve means when said means is in an actuated state; circuit means electrically connected to said valve shifting means so that said valve shifting means is actuated in response to the energization of said circuit means, said circuit means being energized in response to the accumulated material contacting and grounding said single probe sensing means and being maintained in an energized state when said sensing means continues to be grounded due to the fouling thereof; a first timing circuit electrically connected to said circuit means, said first timing circuit being actuated a preselected period of time after the energization of said circuit means, said preselected period of time corresponding to the period required to effect the discharge of a substantial portion of accumulated material from said material receiving vessel; said actuated first timing circuit effecting the deactuation of said valve shifting means to thereby return said valve shifting means to the normal position and normally effecting the deenergization of said circuit means; and a second timing circuit being initially energized a preselected period of time after said first timing circuit and in response to the continued energization of said circuit means, said second timing circuit being connected in circuit with said circuit means so as to be alternately rendered effective and ineffective for preselected periods of time after its initial energization so as to alternately actuate and deactuate said valve shifting means for corresponding periods of time.

*7. Sewage handling apparatus which comprises a sewage receiving vessel; means for supplying sewage to the vessel so as to effect the accumulation of sewage therein; means for discharging accumulated sewage from the vessel; and means for controlling said discharging means; said controlling means including sensing means disposed within said vessel so as to be contacted and grounded by said sewage when said sewage reaches a preselected level within said vessel, means responsive to the accumulated sewage grounding said sensing means for actuating said discharging means for a predetermined period of time so that sewage within said vessel is discharged during said period of time; and means responsive to the fouling and continued grounding of said sensing means for alternately actuating and deactuating the discharging means for preselected periods of time so that the vessel is alternately conditioned to receive sewage for a preselected period of time and to discharge sewage for a preselected period of time notwithstanding the fouling and continued grounding of said sensing means.*

*8. Sewage handling apparatus which comprises a sewage receiving vessel; means for supplying sewage to the vessel so as to effect the accumulation of sewage therein; means for discharging sewage from the vessel; and means for controlling said discharging means; said controlling means including sensing means disposed within said vessel so as to be contacted and grounded by said sewage when said sewage reaches a preselected level within said vessel, means responsive to the accumulated sewage grounding said sensing means for effecting a discharging cycle whereby a substantial portion of the accumulated material is discharged from said vessel, the normal condition of said vessel being such as to receive sewage and precluding the discharge of sewage therefrom, and means responsive to the fouling and continued grounding of said sensing means for automatically effecting alternate accumulating and discharging cycles as long as said sensing means continues to be fouled and grounded.*

*9. Sewage handling apparatus which comprises a closed sewage receiving vessel; inlet means connected to said vessel so as to permit the flow of sewage thereto; vent means connected to said vessel; conduit means connected to said vessel and adapted to be coupled to a source of fluid under pressure; valve means operably associated with said vent means and conduit means of said vessel, said valve means having a normal position that permits communication between said vessel and said vent means and precludes communication with said conduit means, said valve means being shiftable to an alternate position wherein communication is established between said vessel and said conduit means and wherein communication with said vent means is precluded; means connected to said valve means for effecting the selective shifting of said valve means to the alternate position when said means is actuated; sensing means disposed within said vessel so as to be contacted by the sewage therein when a preselected level of sewage accumulation has been reached; outlet means connected to said vessel so as to permit the flow of sewage therefrom; first circuit means electrically connected to said valve shifting means so that said valve shifting means is actuated by the energization of said circuit means in response to accumulated sewage contacting and grounding said sensing means, said first circuit means being deenergized a preselected period of time after the energization thereof and normally after the ungrounding of said sensing means so that said valve shifting means is deactuated, said preselected period of time corresponding to the period required to effect the discharge of a substantial portion of accumulated sewage from said vessel; and second circuit means being alternately rendered effective and ineffective for preselected periods of time as long as said sensing means is fouled and continues to be grounded whereby said valve shifting means is alternately actuated and deactuated for corresponding periods of time and the sewage handling apparatus is alternated between a sewage receiving state and a sewage ejecting state notwithstanding the fouling of said sensing means.*

*10. A circuit for controlling sewage handling apparatus including a closed sewage receiving vessel that has a vent communicating with the surrounding environment and a supply conduit coupled to a source of fluid under pressure, the apparatus also having a selectively operable valve means that has a normal position which establishes communication between the vessel and the associated vent and an alternate position that establishes communication between the vessel and the source of fluid through the associated supply conduit, the apparatus further including inlet means that permits the flow of sewage to the vessel and outlet means that permits the flow of sewage out of the vessel after a preselected level of sewage accumulation has been reached as indicated by the sewage contacting and grounding a single probe sensing means that is disposed within the vessel, which control circuit comprises*

*means operably connectable to the valve means of the vessel so as to effect the shifting of said valve means when said means is in an actuated state; first circuit means electrically connected to said valve shifting means so that said valve shifting means is actuated in response to the energization of said circuit means, said circuit means being energized in response to said accumulated sewage contacting and grounding said sensing means, said first circuit means being deenergized a preselected period of time after the energization thereof and normally after the ungrounding of said sensing means so that said valve shifting means is deactuated; said preselected period of time corresponding to the period required to effect the discharge of a substantial portion of accumulated sewage from said vessel; and second circuit means being alternately rendered effective and ineffective for preselected periods of time as long as said sensing means is fouled and continues to be grounded whereby said valve shifting means is alternately*

*actuated and deactuated for corresponding periods of time and the sewage handling apparatus is alternated between a sewage receiving state and a sewage ejecting state notwithstanding the fouling of said sensing means.*

References Cited by the Examiner

The following references, cited by the Examiner, are of record in the patented file of this patent or the original patent.

UNITED STATES PATENTS

| | | | |
|---|---|---|---|
| 1,456,100 | 5/1923 | Eaton | 317—141 |
| 1,813,743 | 7/1931 | Hull | 317—141 |
| 2,817,299 | 12/1957 | Weis | 137—392 X |

MARK NEWMAN, *Primary Examiner.*

W. J. KRAUSS, *Assistant Examiner.*